(12) United States Patent
Sugihara

(10) Patent No.: US 9,217,882 B2
(45) Date of Patent: Dec. 22, 2015

(54) HEAD MOUNTED DISPLAY, DISPLAY DEVICE FOR EYEGLASSES AND TEMPLE TIP FOR DISPLAY DEVICE

(71) Applicant: OLYMPUS CORPORATION, Tokyo (JP)

(72) Inventor: Ryohei Sugihara, Machida (JP)

(73) Assignee: OLYMPUS CORPORATION, Tokyo (JP)

( * ) Notice: Subject to any disclaimer, the term of this patent is extended or adjusted under 35 U.S.C. 154(b) by 0 days.

(21) Appl. No.: 14/264,168

(22) Filed: Apr. 29, 2014

(65) Prior Publication Data

US 2014/0232981 A1  Aug. 21, 2014

Related U.S. Application Data

(63) Continuation of application No. PCT/JP2013/000277, filed on Jan. 22, 2013.

(30) Foreign Application Priority Data

Feb. 10, 2012  (JP) ................................. 2012-027663

(51) Int. Cl.
G02C 11/00 (2006.01)
G02C 7/08 (2006.01)
(Continued)

(52) U.S. Cl.
CPC .............. *G02C 11/10* (2013.01); *G02B 27/017* (2013.01); *G02B 27/0176* (2013.01); *G02C 5/143* (2013.01); *G02C 7/086* (2013.01); *G02C 9/00* (2013.01); *G02B 2027/0152* (2013.01);
(Continued)

(58) Field of Classification Search
CPC ................. G02B 2027/015; G02B 2027/0152; G02B 2027/0156; G02B 2027/0178; G02B 2027/0149; G02C 11/10; G02C 9/04; G02C 7/086

USPC ......................................................... 351/158
See application file for complete search history.

(56) References Cited

U.S. PATENT DOCUMENTS

| 8,217,856 | B1* | 7/2012 | Petrou .............................. 345/8 |
| 2008/0106694 | A1* | 5/2008 | Blum et al. .................... 351/158 |
| 2011/0267321 | A1 | 11/2011 | Hayakawa |
| 2013/0021311 | A1* | 1/2013 | Watanabe et al. ............. 345/211 |

(Continued)

FOREIGN PATENT DOCUMENTS

| JP | 2010-91748 A | 4/2010 |
| JP | 2010-166374 A | 7/2010 |

OTHER PUBLICATIONS

Chinese Office Action dated Mar. 4, 2015 from related Chinese Application No. 201380007960.4, together with an English language translation.

*Primary Examiner* — Jordan Schwartz
(74) *Attorney, Agent, or Firm* — Scully, Scott, Murphy & Presser, P.C.

(57) ABSTRACT

A head mounted display that is attached to an eyeglass frame for use, includes: a first unit and a second unit. The first unit includes a first electrical component including a display element and an eyepiece optical part that allows a user to observe a display image by the display element as a virtual image. The second unit which is a temple tip for display device having a temple connecting part to which a temple of the eyeglass frame is attachable includes a second electrical component and an attachment part in which the first unit is detachably engaged and supported. When the first unit is engaged and supported in the attachment part, the first electrical component and the second electrical component are electrically coupled.

30 Claims, 12 Drawing Sheets

(51) Int. Cl.
*G02B 27/01* (2006.01)
*G02C 5/14* (2006.01)
*G02C 9/00* (2006.01)

(52) U.S. Cl.
CPC . *G02B2027/0156* (2013.01); *G02B 2027/0178* (2013.01)

(56) References Cited

U.S. PATENT DOCUMENTS

2013/0201440 A1* 8/2013 Howell et al. .................. 351/158
2013/0329183 A1* 12/2013 Blum et al. .................... 351/158
2014/0009839 A1* 1/2014 Yoshida ........................ 359/630

* cited by examiner

HEAD MOUNTED DISPLAY, DISPLAY DEVICE FOR EYEGLASSES AND TEMPLE TIP FOR DISPLAY DEVICE

The present application claims priority from Japanese patent application JP2012-027663 filed on Feb. 10, 2012, the content of which is hereby incorporated by reference into this application.

BACKGROUND

The present invention generally relates to a head mounted display that is attached to an eyeglass frame for use, a display device for eyeglasses and a temple tip for display device.

BACKGROUND

A conventionally known head mounted display is attached to a supporting frame such as an eyeglass frame via an attachment for use (see JP-A-2010-91748, for example). Another known head mounted display is attached to a dedicated eyeglass frame for use (see JP-A-2010-166374, for example).

SUMMARY

One aspect relates to a head mounted display that is attached to an eyeglass frame for use. The head mounted display includes: a first unit and a second unit. The first unit includes first electrical components including a display element and an eyepiece optical part that allows a user to observe a display image by the display element as a virtual image. The second unit, which is a temple tip for display device having a temple connecting part, to which a temple of the eyeglass frame is attachable, includes second electrical components and an attachment part in which the first unit is detachably engaged and supported. When the first unit is engaged and supported in the attachment part, the first electrical components and the second electrical components are electrically coupled. Another aspect relates to a display device for eyeglasses that is detachably engaged and supported in a temple tip for display device having an eyeglass-side electrical component. The display device for eyeglasses includes: a display-side electrical component including a display element; an eyepiece optical part that allows a user to observe a display image by the display element as a virtual image; and a temple tip connection part to couple the display-side electrical component to the eyeglass-side electrical component electrically when the display device for eyeglasses is engaged and supported in the temple tip for display device. A still another aspect relates to a temple tip for display device, in which a display device for eyeglasses is detachably engaged and supported, the display device for eyeglasses including a display-side electrical component including a display element and an eyepiece optical part that allows a user to observe a display image by the display element as a virtual image. The temple tip for display device includes: an eyeglass-side electrical component; and a display connecting part that couples the eyeglass-side electrical component to the display-side electrical component electrically when the display device for eyeglasses is engaged and supported in the temple tip for display device.

DESCRIPTION OF EXEMPLARY EMBODIMENTS

Figure 1:
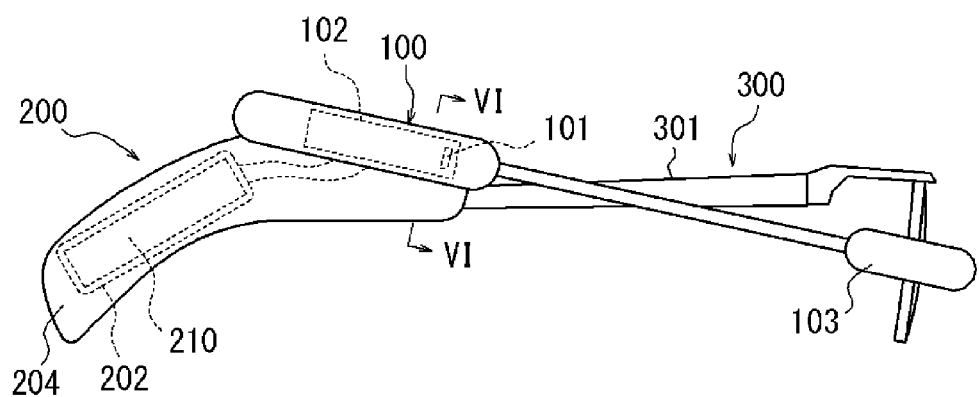
FIG. 1 shows the overall configuration of a head mounted display according to a first embodiment.

Some embodiments can provide a head mounted display, a display device for eyeglasses and a temple tip for display device, in which the display device for eyeglasses can be easily attached/detached and the display device for eyeglasses fits better and more stably, and a user can use the head mounted display comfortably.

One embodiment includes, (1) a head mounted display that is attached to an eyeglass frame for use, and the head mounted display includes: a first unit and a second unit. The first unit includes a first electrical component including a display element and an eyepiece optical part that allows a user to observe a display image by the display element as a virtual image. The second unit which is a temple tip for display device having a temple connecting part to which a temple of the eyeglass frame is attachable includes a second electrical component and an attachment part in which the first unit is detachably engaged and supported. When the first unit is engaged and supported in the attachment part, the first electrical component and the second electrical component are electrically coupled.

Another embodiment includes, (2) the head mounted display according to (1), wherein when the first unit is engaged and supported in the attachment part, a load of the first unit is applied to an ear of the user via the second unit.

Still another embodiment includes, (3) the head mounted display according to (1) or (2), wherein the attachment part and the first unit each include at least a pair of electrodes to electrically couple the first electrical component and the second electrical component when the first unit is engaged and supported in the attachment part.

A further embodiment includes, (4) the head mounted display according to (1) or (2), wherein in the attachment part, the first unit is engaged and supported to be slidable along the temple tip, and the attachment part and the first unit each include at least a pair of electrodes to electrically couple the first electrical component and the second electrical component when the first unit is engaged and supported in the attachment part.

A still further embodiment includes, (5) the head mounted display according to (4) wherein the pair of electrodes as the pair at each of the attachment part and the first unit are disposed to be away from each other in a direction orthogonal to a sliding direction of the head mounted display.

Another embodiment includes, (6) the head mounted display according to any one of (1) to (5), wherein the attachment part is disposed above the ear of the user.

Still another embodiment includes, (7) the head mounted display according to (6), wherein the attachment part has a shape that is inclined downwardly toward a front side of the ear of the user.

A further embodiment includes, (8) the head mounted display according to any one of (1) to (7), wherein the second electrical part contains at least one of a power supply, a user information acquisition part, a sound output part and a controller.

A still further embodiment includes, (9) the head mounted display according to (8), wherein the second electrical part contains a battery, and when the first unit is engaged and supported in the attachment part, electricity is supplied from the battery to the first electrical component.

Another embodiment includes,

(10) the head mounted display according to (9), wherein the second unit has a center of mass thereof that is located behind the ear of the user.

Still another embodiment includes,

(11) the head mounted display according to (9), wherein the battery is disposed behind the ear of the user.

A further embodiment includes,

(12) the head mounted display according to (8), wherein the second unit includes a sensor built therein, and when the first unit is engaged and supported in the attachment part, output information from the sensor is transmitted to the first electrical component.

A still further embodiment includes,

(13) the head mounted display according to (8), wherein the second electrical component includes a speaker built therein, and when the first unit is engaged and supported in the attachment part, a sound signal is transmitted from the first electrical component to the second electrical component.

Another embodiment includes,

(14) the head mounted display according to (8), wherein the second electrical component include a sensor, a signal processing circuit, a memory and a battery built therein, and when the first unit is not engaged and supported in the attachment part, output information from the sensor is stored in the memory via the signal processing circuit.

Still another embodiment includes,

(15) the head mounted display according to (8), wherein the second electrical components further include a driving circuit of the display element built therein, and when the first unit is engaged and supported in the attachment part, the display element is driven by the driving circuit.

In order to fulfill the aforementioned object, a display device for eyeglasses can be configured as follows.

(16) A display device for eyeglasses that is detachably engaged and supported in a temple tip of the eyeglasses for display device having an eyeglass-side electrical component, the display device including: a display-side electrical component including a display element; an eyepiece optical part that allows a user to observe a display image by the display element as a virtual image; and a temple tip connection part that electrically couples the display-side electrical component to the eyeglass-side electrical component when the display device for eyeglasses is engaged and supported in the temple tip for display device.

In order to fulfill the aforementioned object, a temple tip for display device can be configured as follows.

(17) A temple tip for display device, in which a display device for eyeglasses is detachably engaged and supported, the display device for eyeglasses including a display-side electrical component including a display element; and an eyepiece optical part that allows a user to observe a display image by the display element as a virtual image, and the temple tip for display device includes: an eyeglass-side electrical component; and a display connecting part that electrically couples the eyeglass-side electrical component to the display-side electrical component when the display device for eyeglasses is engaged and supported in the temple tip for display device. The following describes embodiments, with reference to the drawings.

(First Embodiment)

Figure 2:
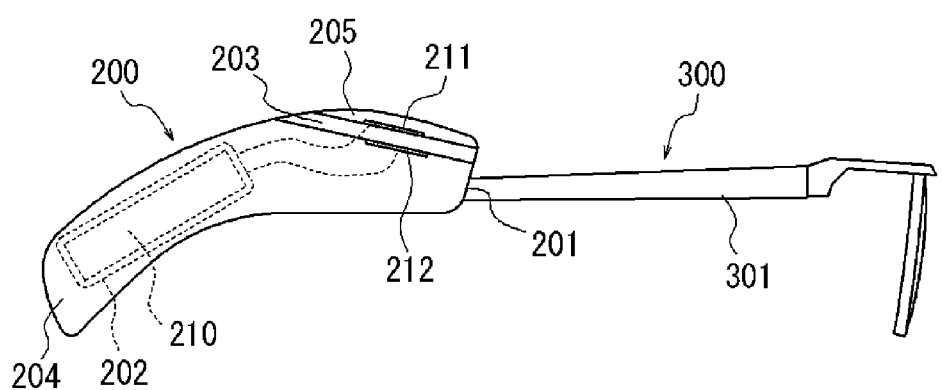
FIG. 2 shows the state where the display device for eyeglasses of FIG. 1 is detached.

FIG. 1 and FIG. 2 show the configuration of a head mounted display according to a first embodiment. The head mounted display according to the present embodiment includes a display device for eyeglasses 100 that is a first unit and a temple tip for display device 200 that is a second unit. FIG. 1 shows the overall configuration of the state where the display device for eyeglasses 100 is attached to the temple tip for display device 200. FIG. 2 shows the state where the display device for eyeglasses 100 is detached from the temple tip for display device 200.

The display device for eyeglasses 100 includes: a first electrical component (display-side electrical component) 102 including a display element 101; and an eyepiece optical part 103 that allows a user (a person who wears the head mounted display) to observe a display image by the display element 101 as a virtual image. In FIG. 1, the first electrical component 102 can be provided on the temple tip for display device 200 side, which may be provided on the side of the eyepiece optical part 103. The first electrical component 102 may be divided and be provided on the temple tip for display device 200 side and the eyepiece optical part 103 side, where the divided electrical component may be connected by a flexible print wiring board. In this case, the display element 101 is provided at the electrical component on the eyepiece optical part 103 side.

Figure 3:
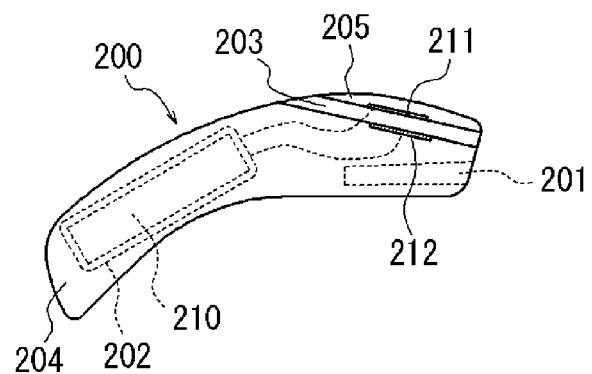
FIG. 3 is a partial detailed view of the temple tip for display device of FIG. 1.

As shown in a partial detailed view of FIG. 3, the temple tip for display device 200 includes: a temple connecting part 201 to be attached to a temple 301 of an eyeglass frame 300; a second electrical component (eyeglass-side electrical component) 202; and a groove 203 that is an attachment part, in which the display device for eyeglasses 100 is engaged detachably for supporting. The second electrical component 202 can be provided at a rear part 204 that is located behind an ear of the user on the temporal side when the user wears the eyeglass frame 300. The groove 203 is provided at an upper part 205 that is located approximately above the ear of the user wearing the eyeglass frame 300. As shown in FIG. 2, the temple tip for display device 200 is used in the state where the temple 301 of the eyeglass frame 300 is inserted into the temple connecting part 201 and is jointed thereto beforehand. This means that the temple tip for display device 200 can be used for eyeglass frames of various shapes. The temple tip for display device 200 attached to the eyeglass frame 300 has its center of mass that is located behind the ear of the user.

Figure 4:
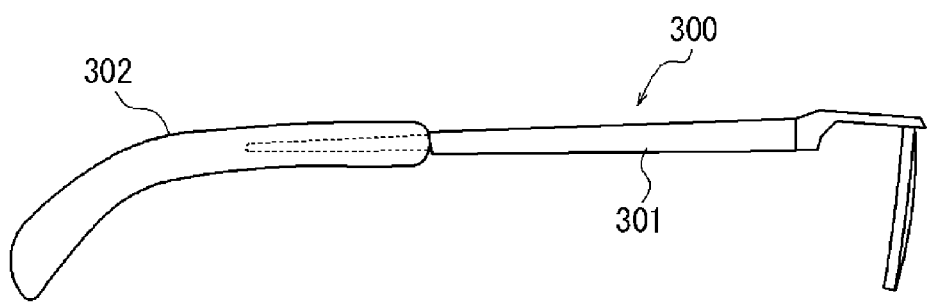
FIG. 4 shows a conventional eyeglass frame.

The temple 301 typically has a tapered shape having the end becoming thinner toward the temple tip side. As shown in FIG. 4, an already-existing eyeglass frame 300 has a thin tip part of the temple 301 that can be inserted detachably into a temple tip 302 for fixing. This allows the temple tip 302 to be replaced with a new one. Thus, the temple tip 302 of the eyeglass frame 300 that a user has is replaced with the temple tip for display device 200 shown in FIG. 3 beforehand, whereby the user can use the head mounted display with their favorite eyeglass frame 300.

The groove 203 has a semi-columnar hollow shape, in which the display device for eyeglasses 100 is engaged and supported so as to be slidable in the front-rear direction that is inclined downwardly toward the front side with reference to the temple 301. That is, assuming that the face side relative to the ear is the front side, the front side of the groove 203 is lower than the rear side.

Figure 5:
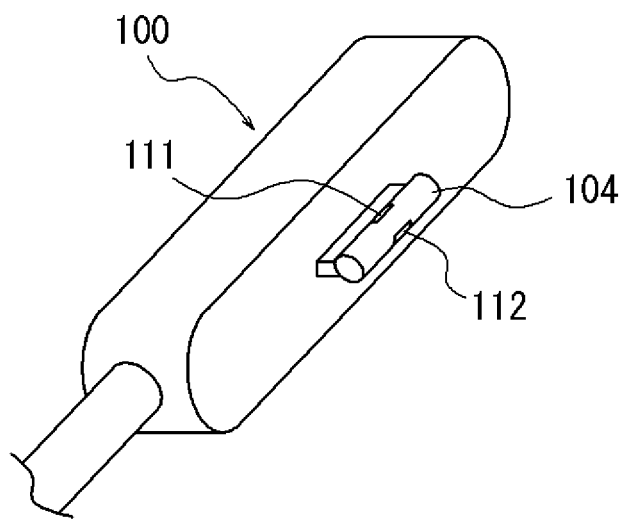
FIG. 5 is a partial perspective view of the display device for eyeglasses of FIG. 1.
Figure 6:
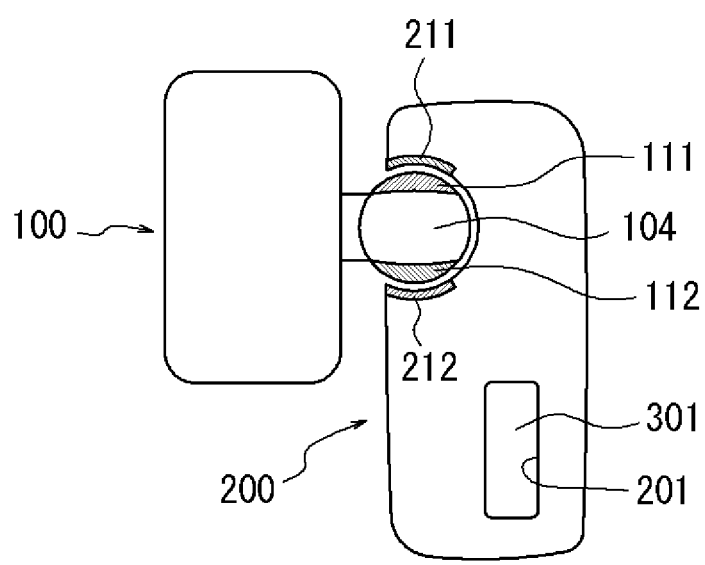
FIG. 6 is a cross-sectional view taken along the line VI-VI of FIG. 1.

To this end, as shown in FIGS. 5 and 6, the display device for eyeglasses 100 has a columnar protrusion 104 that is detachably engaged in the groove 203 of the temple tip for display device 200. Herein FIG. 5 is a partial perspective view of the display device for eyeglasses 100 and FIG. 6 is a cross-sectional view taken along the line VI-VI of FIG. 1. The display device for eyeglasses 100 is easily engaged and supported in the groove 203 by inserting its protrusion 104 from one end of the groove 203 of the temple tip for display device 200, for example. Alternatively, the groove 203 may be elastically deformable at least at its opening along the sliding direction of the display device for eyeglasses 100. When the protrusion 104 of the display device for eyeglasses 100 is pressed against the opening of the groove 203 from the direction orthogonal to the axial direction of the groove 203, then the opening becomes large due to elastic deformation. Thereby, the protrusion 104 of the display device for eyeglasses 100 is inserted into the groove 203 from the opening, whereby the display device for eyeglasses 100 can be easily engaged and supported in the groove 203.

In the head mounted display according to the present embodiment, the second electrical component 202 of the temple tip for display device 200 contains a battery 210. Then electricity from the battery 210 is supplied to the first electrical component 102 of the display device for eyeglasses 100 when the display device for eyeglasses 100 is engaged and supported in the groove 203 of the temple tip for display device 200. To this end, the groove 203 of the temple tip for display device 200 is provided with a pair of electrodes 211 and 212 to supply electricity from the battery 210 contained in the second electrical component 202 to the display device for eyeglasses 100. The electrodes 211 and 212 are disposed at the inner wall of the semi-columnar hollow shaped groove 203 so as to be away from each other in the direction orthogonal to the sliding direction of the display device for eyeglasses 100. In the present embodiment, the electrodes 211 and 212 are provided at opposed parts of the inner wall of the groove 203.

The display device for eyeglasses 100 is provided with a pair of electrodes 111 and 112 on the protrusion 104 so as to be in contact with the pair of electrodes 211 and 212 of the groove 203 in the engagement state of the protrusion 104 with the groove 203. In the present embodiment, the electrode 211 and the electrode 111 are in contact, and the electrode 212 and the electrode 112 are in contact. At least one of the electrode 211 and the electrode 111 and at least one of the electrode 212 and the electrode 112 extend in the sliding direction so as to be in contact with its corresponding electrode over the sliding range of the display device for eyeglasses 100. In the present embodiment, the electrodes 211 and 212 on the groove 203 side extend in the sliding direction. When a user wears the eyeglass frame 300 attached to the temple tip for display device 200, the display device for eyeglasses 100 has the center of mass that is located ahead of the ear of the user.

Figure 7:
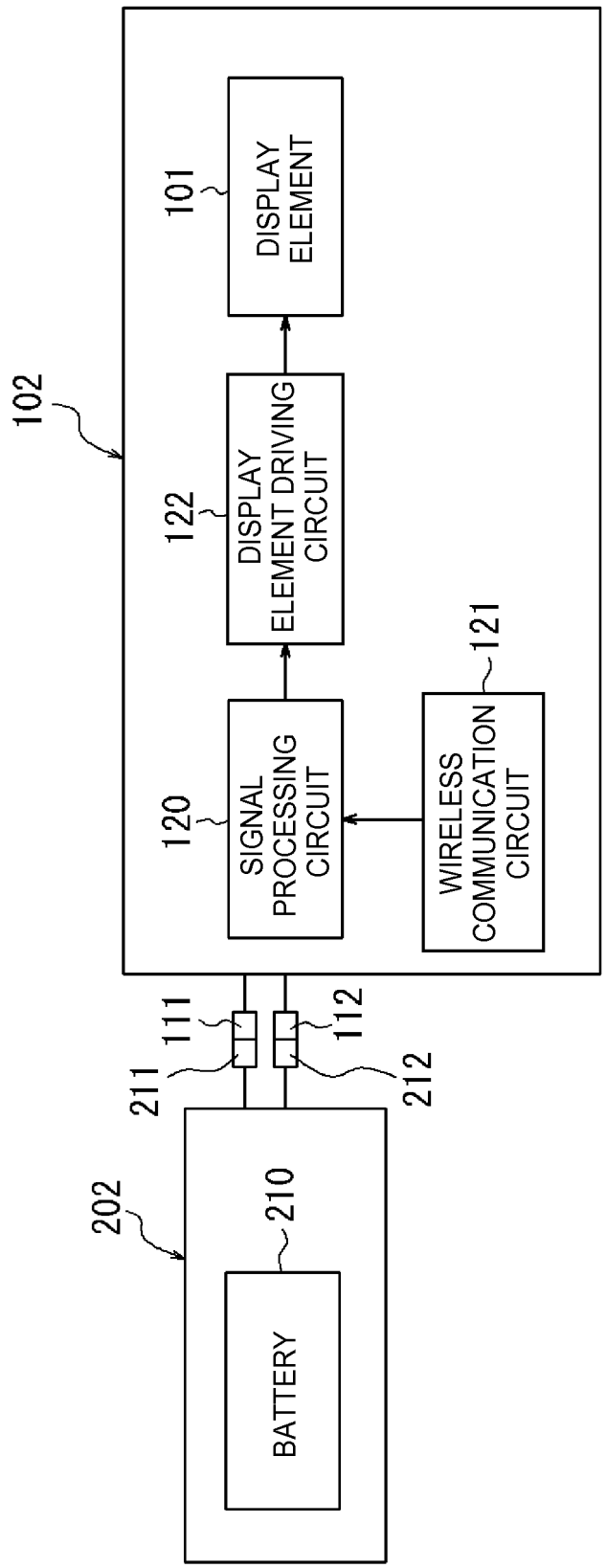
FIG. 7 shows the configuration of a first electrical part and a second electrical part in the head mounted display of FIG. 1.

FIG. 7 shows the configuration of the first electrical component 102 and the second electrical component 202 in the head mounted display according to the present embodiment. As described above, the second electrical component 202 of the temple tip for display device 200 contains the battery 210. The first electrical component 102 of the display device for eyeglasses 100 includes a signal processing circuit 120, a wireless communication circuit 121 and a display element driving circuit 122 built therein in addition to the aforementioned display element 101.

The signal processing circuit 120, the wireless communication circuit 121, the display element driving circuit 122 and the display element 101 receive electricity supplied from the battery 210 via the electrodes 211, 212 and the electrodes 111, 112 for operation. The signal processing circuit 120 processes display information from an external communication device that the wireless communication circuit 121 receives, and the information is displayed by the display element 101 via the display element driving circuit 122.

According to the head mounted display of the present embodiment, the protrusion 104 of the display device for eyeglasses 100 is detachably engaged and supported in the groove 203 of the temple tip for display device 200, and so the display device for eyeglasses 100 can be easily attached/detached and the display device for eyeglasses 100 fits better and more stably, and the user can use the head mounted display comfortably. When the head mounted display is not used, the display device for eyeglasses 100 can be detached from the temple tip for display device 200, and then the eyeglass frame 300 can be used.

The display device for eyeglasses 100 is inclined downwardly toward the front side with reference to the temple 301 and is supported slidably in the inclining front-rear direction. Thus the user can easily adjust the attachment position of the display device for eyeglasses 100 depending on various sizes of the eyeglass frame 300 and the user's head size. The user wearing the eyeglass frame 300 can avoid interference of the display device for eyeglasses 100 with the ear and can avoid interference of the display device for eyeglasses 100 at the front side with the eyeglass frame 300.

Further the groove 203 of the temple tip for display device 200 is located at the upper part 205 that is approximately above the user's ear, which can prevent the weight of the display device for eyeglasses 100 from being placed on the front side of the eyeglass frame 300. This can especially prevent the inclination of the eyeglass frame 300 due to the weight placed to the front part of the eyeglass frame 300 on the single side, and so the display device for eyeglasses 100 can be stably supported by the ear of the user. Thus the display device for eyeglasses 100 can fit well and more stably, and the user can use the head mounted display more comfortably.

Since the battery 210 is contained in the temple tip for display device 200, the weight of the head mounted display can be distributed between the temple tip for display device 200 side and the display device for eyeglasses 100 side. Especially the heavy battery 210 is disposed at the rear part 204 that is the supporting part of the eyeglass frame 300 and is located behind the ear of the user on the temporal side, the user can wear the head mounted display stably without interference. Further, the center of mass of the temple tip for display device 200 is located behind the ear of the user and the battery 210 is disposed behind the ear of the user, and so a moment force due to the load of the display device for eyeglasses 100 that is disposed at a position away from the ear can be reduced, thus leading to better balance of the head mounted display as a whole. That is, since the display device for eyeglasses 100 includes the eyepiece optical part 103, the center of mass of the display device for eyeglasses 100 is typically located ahead of the ear. However, since the center of mass of the temple tip for display device 200 is located behind the ear of the user, the weight balance as a whole can be kept. Thus the head mounted display can fit better and more stably. Moreover since there is no need to include a battery on the display device for eyeglasses 100 side, the display device for eyeglasses 100 can be lighter in weight and be made compact, and the design of the appearance can be improved.

(Second Embodiment)

Figure 8:
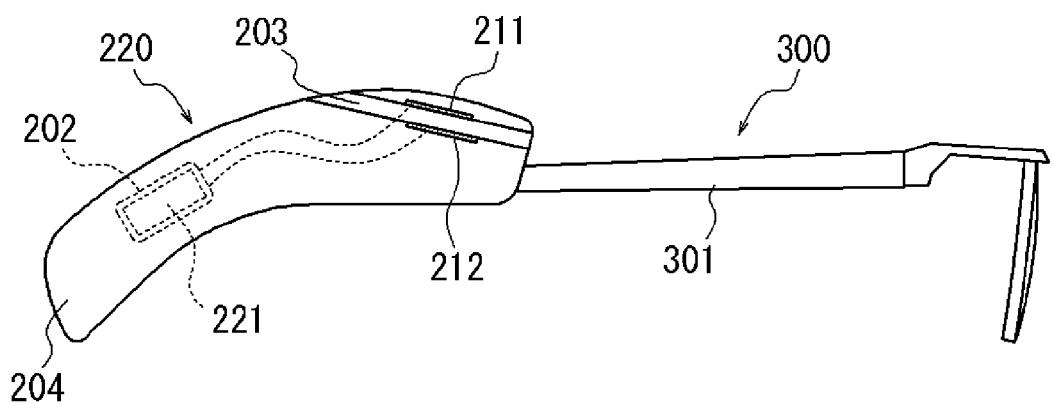
FIG. 8 shows the configuration of a temple tip for display device of a head mounted display according to a second embodiment.

FIG. 8 shows the configuration of a temple tip for display device of a head mounted display according to a second embodiment. A temple tip for display device 220 according to the present embodiment includes a sensor 221 instead of the battery 210 at the second electrical component 202 of the temple tip for display device 200 of the head mounted display of the first embodiment. The sensor 221 is connected to electrodes 211 and 212 so that information detected by the sensor 221 is supplied to first electrical component 102 on the side of a display device for eyeglasses 100 via the electrodes 211, 212 and electrodes 111, 112 on the display device for eyeglasses 100 side described in the first embodiment.

The sensor 221 may be a sensor that is available for a map display purpose, such as an acceleration sensor, a direction sensor, or a global positioning system (GPS). Alternatively, the sensor 221 may be a sensor disposed in contact with a human body to acquire biological information such as myoelectric potential, pulse waves and body temperatures. Especially the acceleration sensor is preferably used to determine the degree of inclination of the user's head or the direction sensor is preferably used to determine the direction where the head faces because the position of the temple tip for display device 220 is fixed on the head when the user wears it. Further since the temple tip for display device 220 is a member that is directly in contact with a human body, it is preferably used to include a myoelectric sensor, a pulse wave sensor or a temperature sensor built therein, which is to be used in contact with a human body for use.

Figure 9:
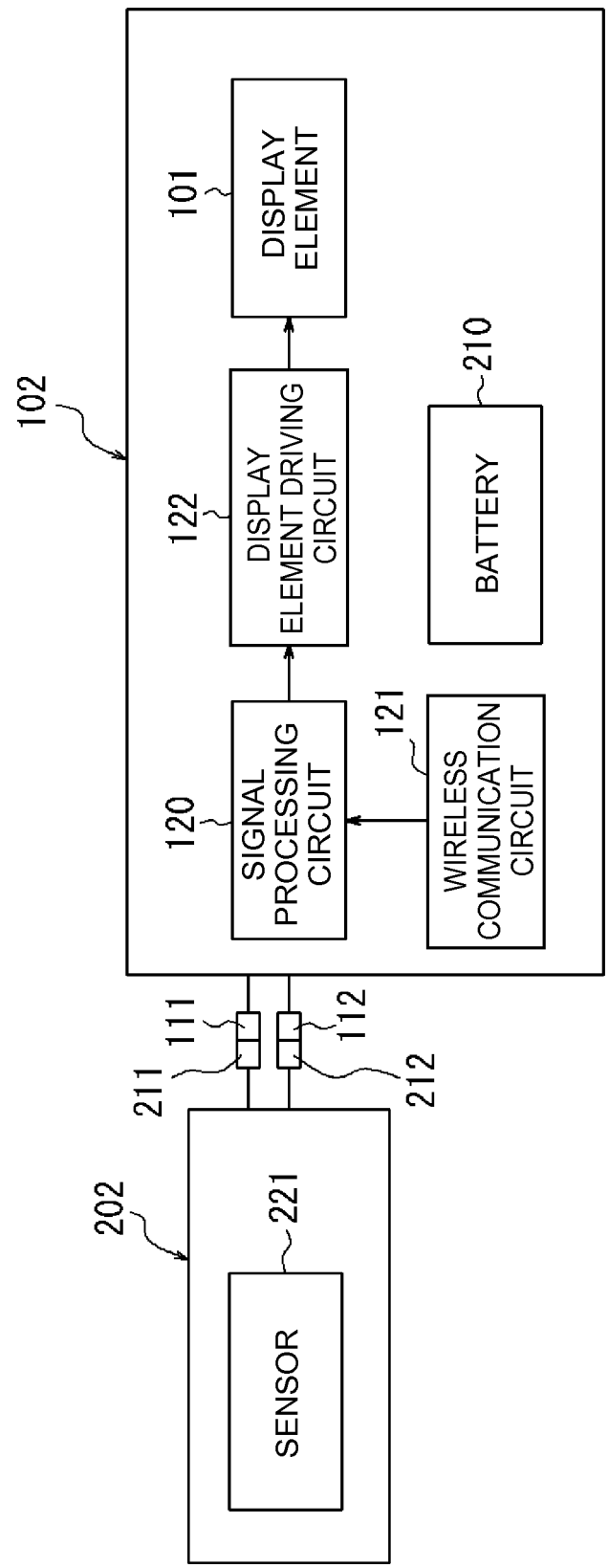
FIG. 9 shows the configuration of a first electrical part and a second electrical part in the head mounted display including the temple tip for display device of FIG. 8.

FIG. 9 shows the configuration of the first electrical component 102 and the second electrical component 202 in the head mounted display including the temple tip for display device of FIG. 8. As described above, the second electrical component 202 of the temple tip for display device 220 contains the sensor 221. The first electrical component 102 of the display device for eyeglasses 100 include a signal processing circuit 120, a wireless communication circuit 121 and a display element driving circuit 122 built therein in addition to the aforementioned display element 101, and contains a battery 210.

Similarly to the first embodiment, the signal processing circuit 120 processes display information from an external communication device that the wireless communication circuit 121 receives, and the information is displayed by the display element 101 via the display element driving circuit 122. Information detected by the sensor 221 is supplied to the signal processing circuit 120 via the electrodes 211, 212 and the electrodes 111, 112 for processing. Thereby, display information at the display element 101 is controlled in accordance with the information detected by the sensor 221.

When the sensor 221 needs electricity from the battery 210, an electrode for electricity supplying may be provided on the display device for eyeglasses 100 side and at the temple tip for display device 220 separately from the electrodes 111, 112 and the electrodes 211, 212 or by partially sharing with these electrodes. Alternatively, information detected by the sensor 221 may be modulated appropriately, and a well-known method to separate a DC component therefrom may be used, for example, whereby the electrodes 111, 112 and the electrodes 211, 212 are shared between transmission of the detected information and supplying of electricity.

The head mounted display of the present embodiment includes the sensor 221 at the temple tip for display device 220. Herein when the user wears the eyeglass frame 300, the temple tip for display device 220 is always located at a fixed position on the head as stated above and is always in contact with the user's body. Then, when the sensor 221 is a sensor such as an acceleration sensor or a direction sensor, where the reference position or the direction is important for the sensors, calibration of the sensors only once is enough and the user does not have to adjust the position every time because the position of the temple tip for display device 220 is fixed on the head. When the sensor 221 is a sensor that is in contact with a human body for use, such as a pulse wave sensor, a myoelectric sensor or a temperature sensor, since the temple tip for display device 220 is always in contact with the temporal part on the back side of the ear, the sensor can sense biological information stably. This facilitates information display while sensing the biological information. Similar effects to those of the first embodiment also can be obtained.

(Modification Example of Second Embodiment)

Figure 10:
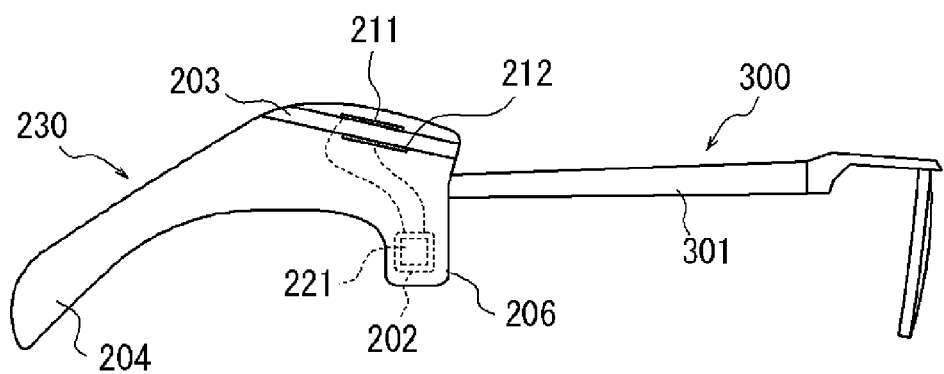
FIG. 10 shows a modification example of the temple tip for display device of FIG. 8.

FIG. 10 shows a modification example of the temple tip for display device of the head mounted display according to the second embodiment. This temple tip for display device 230 includes a forward part 206 that is in contact with a temporal part (temple) ahead of the ear of the user when the user wears an eyeglass frame 300. The forward part 206 is provided with a second electrical component 202, and the second electrical component 202 includes a sensor 221 disposed therein. The other configuration is similar to that of the second embodiment. In this case also, the sensor 221 is always in contact with the temporal part of the user ahead of the ear, and so the sensor 221 can sense desired information stably and similar effects to those of the second embodiment can be obtained.

(Third Embodiment)

Figure 11:
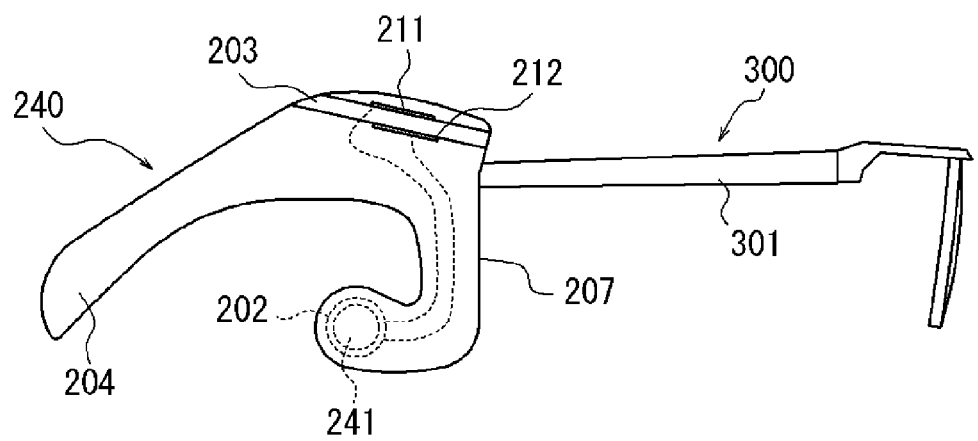
FIG. 11 shows the configuration of a temple tip for display device of a head mounted display according to a third embodiment.

FIG. 11 shows the configuration of a temple tip for display device of a head mounted display according to a third embodiment. A temple tip for display device 240 according to the present embodiment is for detachable engagement and supporting of the display device for eyeglasses 100 described in the first embodiment, and includes an earphone part 207 that extends along the surrounding of the forward side of the ear so as to cover the ear canal when the user wears an eyeglass frame 300. The earphone part 207 is provided with a second electrical component 202 at a part covering the ear canal, and the second electrical component 202 includes a speaker 241 built therein. The speaker 241 is connected to electrodes 211, 212, to which a sound signal and an acoustic signal are supplied from a first electrical component 102 on the display device for eyeglasses 100 side via electrodes 111, 112 on the display device for eyeglasses 100 side for driving of the speaker 241.

Figure 12:
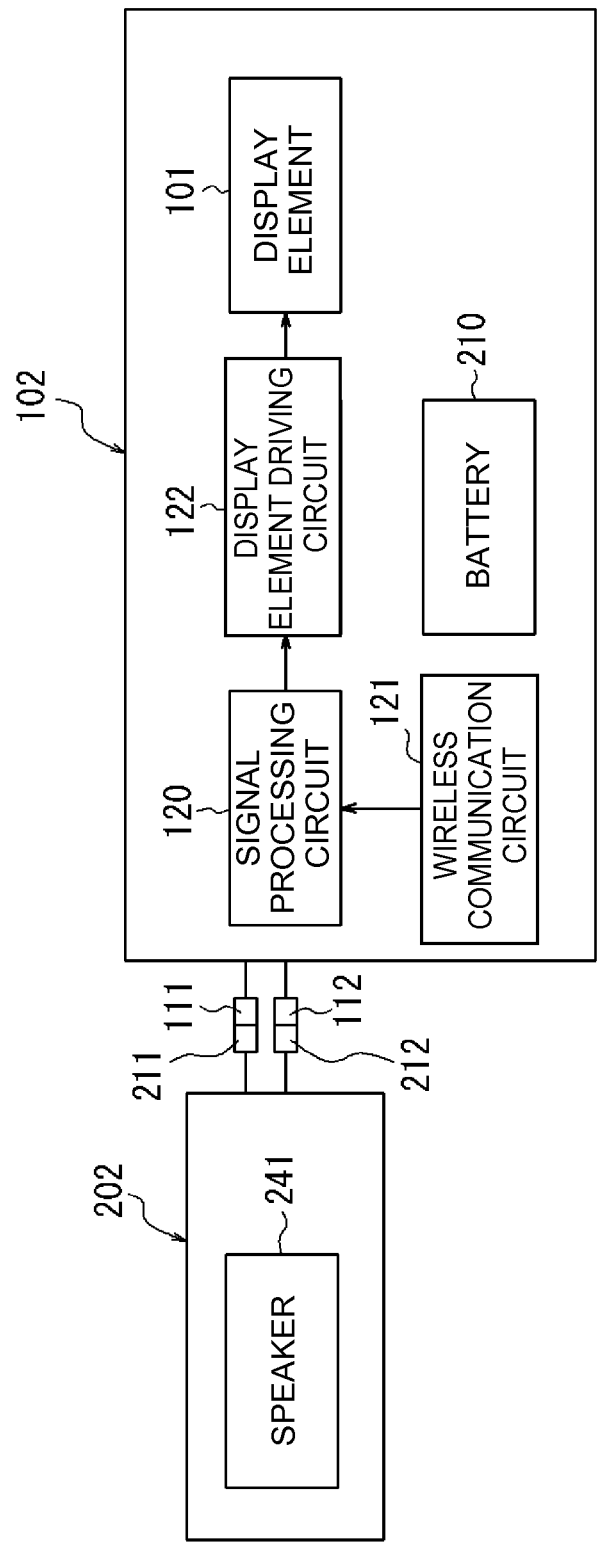
FIG. 12 shows the configuration of a first electrical part and a second electrical part in the head mounted display including the temple tip for display device of FIG. 11.

FIG. 12 shows the configuration of the first electrical component 102 and the second electrical component 202 in the head mounted display including the temple tip for display device of FIG. 11. As described above, the second electrical component 202 of the temple tip for display device 240 includes the speaker 241 built therein. Similarly to the second embodiment, the first electrical component 102 of the display device for eyeglasses 100 include a display element 101, a signal processing circuit 120, a wireless communication circuit 121 and a display element driving circuit 122 built therein, and contains a battery 210.

Similarly to the aforementioned embodiments, the signal processing circuit 120 processes display information from an external communication device that the wireless communication circuit 121 receives, and the information is displayed by the display element 101 via the display element driving circuit 122. Sound information and acoustic information from an external communication device that the wireless communication circuit 121 receives are processed by the signal processing circuit 120, which are then supplied to the speaker 241 as sound signals and acoustic signals via electrodes 111, 112 and electrodes 211, 212. This allows the user to view and listen to the information acquired from an external communication device by the display element 101 and the speaker 241. Of course the user is allowed to view images or the like only by the display element 101 or to listen to voice and sounds only by the speaker 241 depending on acquired information or by the user's selection.

The head mounted display according to the present embodiment enables viewing of images or the like by the display device for eyeglasses 100 and listening of voice and sounds by the temple tip for display device 240. Similar effects to those of the first embodiment also can be obtained.

(Modification Example of Third Embodiment)

Figure 13:
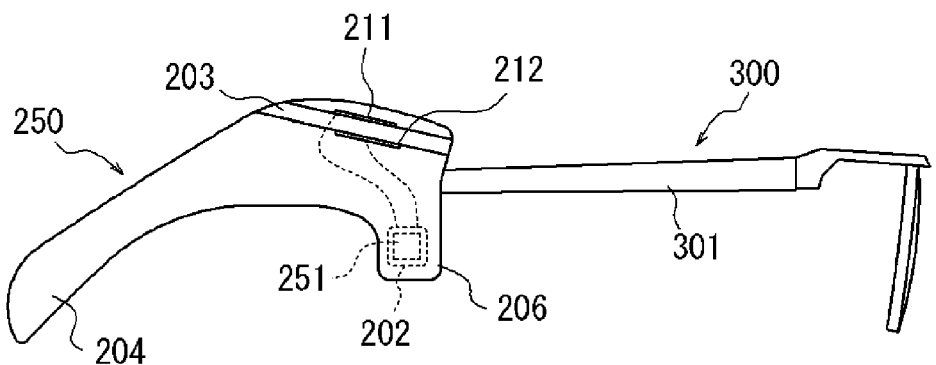
FIG. 13 shows a modification example of the temple tip for display device of FIG. 11.

FIG. 13 shows a modification example of the temple tip for display device of the head mounted display according to the third embodiment. This temple tip for display device 250 includes a forward part 206 that is in contact with a temporal part (temple) ahead of the ear of the user when the user wears an eyeglass frame 300. The forward part 206 is provided with a second electrical component 202, and the second electrical component 202 includes a bone-conduction speaker 251 (vibration element) disposed therein. The other configuration is similar to that of the third embodiment. In this case also, the bone-conduction speaker 251 is always in contact with the temporal part of the user ahead of the ear, and so the user can listen to sound signals and acoustic signals from the display device for eyeglasses 100 via the bone-conduction speaker 251, and so similar effects to those of the third embodiment can be obtained.

(Fourth Embodiment)

Figure 14:
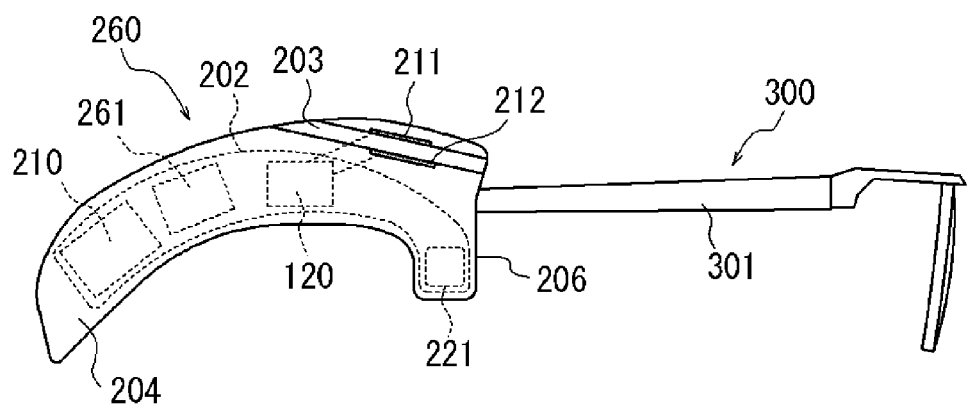
FIG. 14 shows the configuration of a temple tip for display device of a head mounted display according to a fourth embodiment.

FIG. 14 shows the configuration of a temple tip for display device of a head mounted display according to a fourth embodiment. A temple tip for display device 260 according to the present embodiment is for detachable engagement and supporting of the display device for eyeglasses 100 described in the first embodiment, and similarly to FIG. 10, includes a forward part 206 that is in contact with a temporal part (temple) ahead of the ear of the user when the user wears an eyeglass frame 300. The temple tip for display device 260 is provided with a second electrical component 202 across the forward part 206, an upper part 205 and a rear part 204, and the second electrical component 202 includes a battery 210, a memory 261, a signal processing circuit 120 and a sensor 221 mounted therein. The battery 210 is provided at the rear part 204, the sensor 221 is provided at the forward part 206, and the memory 261 and the signal processing circuit 120 are provided between the battery 210 and the sensor 221. The signal processing circuit 120 and the battery 210 are connected to the electrodes 211, 212.

Figure 15:
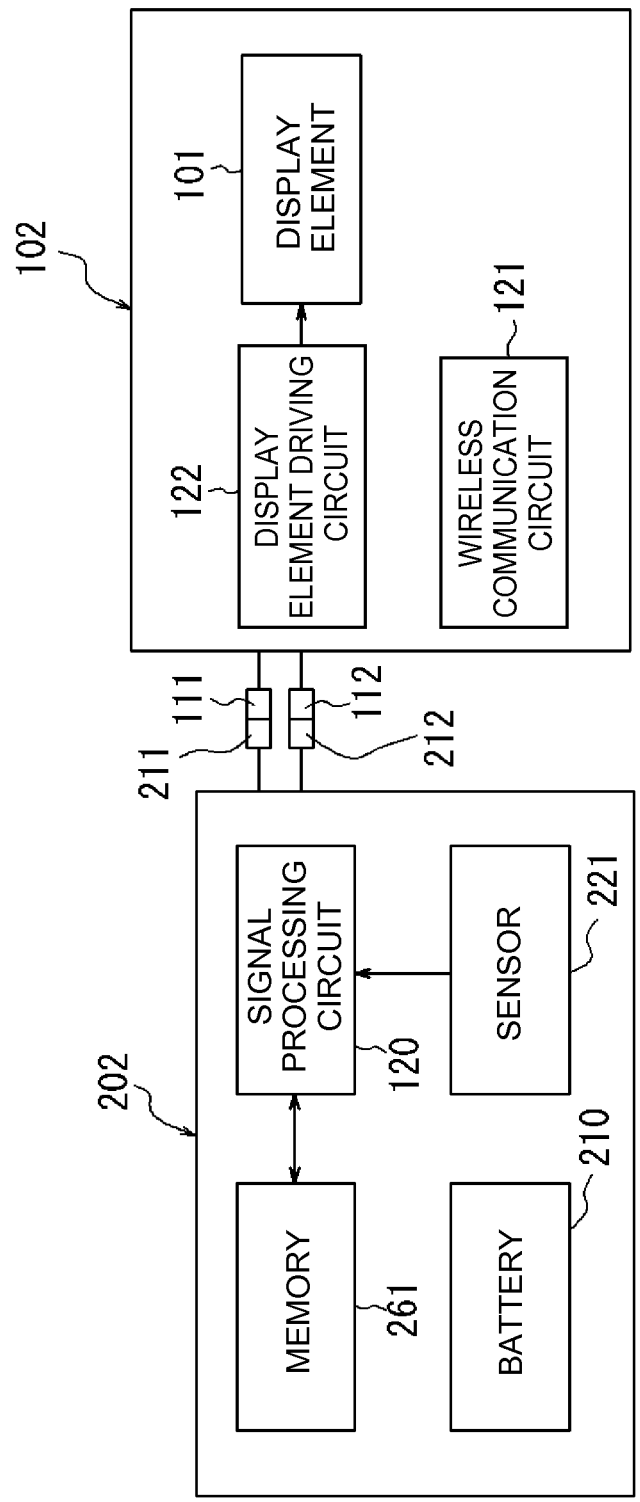
FIG. 15 shows the configuration of a first electrical part and a second electrical part in the head mounted display including the temple tip for display device of FIG. 14.

FIG. 15 shows the configuration of the first electrical component 102 and the second electrical component 202 in the head mounted display including the temple tip for display device of FIG. 14. As stated above, the second electrical component 202 of the temple tip for display device 260 includes the battery 210, the memory 261, the signal processing circuit 120 and the sensor 221 built therein. The first electrical component 102 of the display device for eyeglasses 100 includes a display element 101, a wireless communication circuit 121 and a display element driving circuit 122 built therein.

In the second electrical component 202, electricity of the battery 210 is supplied to the memory 261 and the signal processing circuit 120, and is supplied to the sensor 221 as needed. Electricity of the battery 210 further is supplied to the wireless communication circuit 121, the display element driving circuit 122 and the display element 101 mounted at the first electrical component 102 on the display device for eyeglasses 100 side via electrodes 211, 212 and electrodes 111, 112 on the display device for eyeglasses 100 side. Similarly, output from the signal processing circuit 120 is supplied to the display element driving circuit 122 via the electrodes 211, 212 and the electrodes 111, 112.

Herein, the electrodes 211, 212 on the temple tip for display device 260 side and the electrodes 111, 112 on the display device for eyeglasses 100 side are used for both supplying electricity and exchanging signals. Therefore, in this case, signals are modulated and a well-known method to separate a DC component therefrom is used, whereby supplying of electricity and exchanging of signals are electrically separated. Of course, another set of electrodes may be provided separately from the electrodes 111, 112 and the electrodes 211, 212 or by partially sharing with these electrodes for separation of supplying of electricity and exchanging of signals.

The head mounted display according to the present embodiment includes the battery 210, the memory 261, the signal processing circuit 120 and the sensor 221 at the temple tip for display device 260. This configuration allows, even when the display device for eyeglasses 100 is not connected to the temple tip for display device 260, information detected by the sensor 221 to be stored in the memory 261. Then, after the display device for eyeglasses 100 is connected to the temple tip for display device 260, the detection information stored in the memory 261 can be read and be displayed at the display element 101, or other information may be displayed on the basis of the stored detected information. Similar effects to those of the second embodiment also can be obtained.

(Fifth Embodiment)

Figure 16:
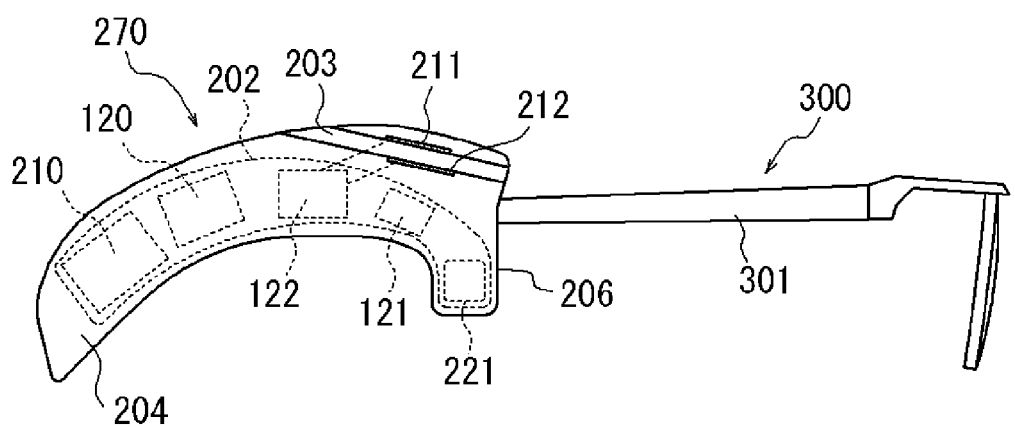
FIG. 16 shows the configuration of a temple tip for display device of a head mounted display according to a fifth embodiment.

FIG. 16 shows the configuration of a temple tip for display device of a head mounted display according to a fifth embodiment. A temple tip for display device 270 according to the present embodiment includes a battery 210, a signal processing circuit 120, a wireless communication circuit 121, a display element driving circuit 122 and a sensor 221 comprising the second electrical component 202 of the temple tip for display device 260 of the fourth embodiment. Herein, the battery 210 is provided at the rear part 204, the sensor 221 is provided at the forward part 206, and the signal processing circuit 120, the wireless communication circuit 121 and the display element driving circuit 122 are provided between the battery 210 and the sensor 221. The display element driving circuit 122 and the battery 210 are connected to electrodes 211, 212.

Figure 17:
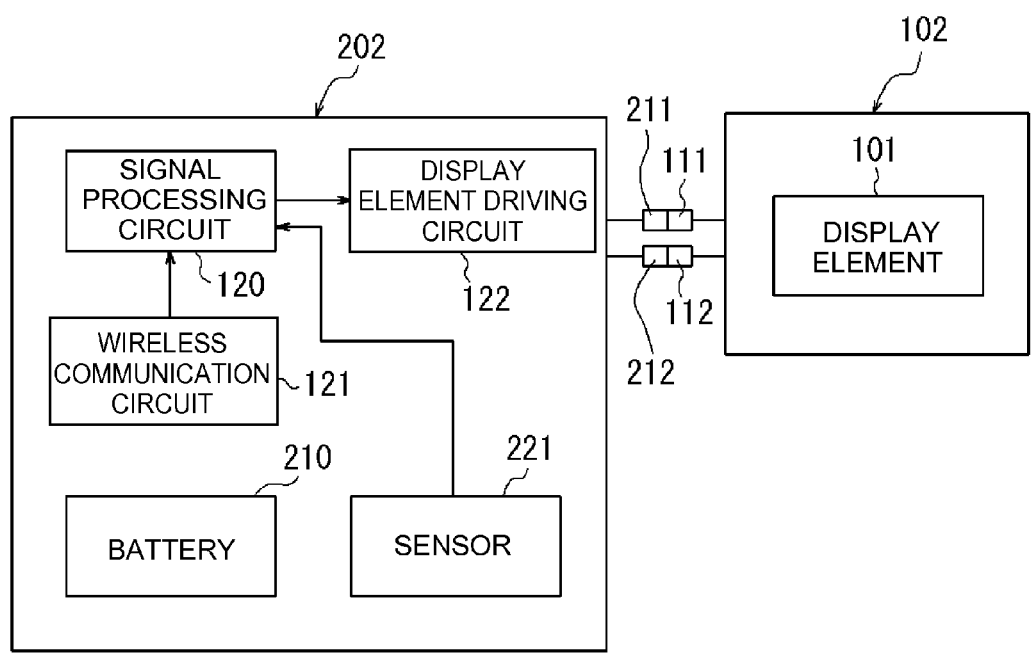
FIG. 17 shows the configuration of a first electrical part and a second electrical part in the head mounted display including the temple tip for display device of FIG. 16.

FIG. 17 shows the configuration of the first electrical component 102 and the second electrical component 202 in the head mounted display including the temple tip for display device of FIG. 16. As stated above, the second electrical component 202 of the temple tip for display device 270 includes the battery 210, the signal processing circuit 120, the wireless communication circuit 121, the display element driving circuit 122 and the sensor 221 built therein. The first electrical component 102 of the display device for eyeglasses 100 includes a display element 101 built therein.

In the second electrical component 202, electricity of the battery 210 is supplied to the signal processing circuit 120, the wireless communication circuit 121 and the display element driving circuit 122 and is supplied to the sensor 221 as needed. Electricity of the battery 210 further is supplied to the display element 101 mounted at the first electrical component 102 on the display device for eyeglasses 100 side via electrodes 211, 212 and electrodes 111, 112 on the display device for eyeglasses 100 side. Similarly, output from the display element driving circuit 122 is supplied to the display element 101 via the electrodes 211, 212 and the electrodes 111, 112. Electricity supplying and signal transmission to the first electrical component 102 as well as the electrode configuration are similar to those of the fourth embodiment.

The head mounted display according to the present embodiment includes the wireless communication circuit 121 and the display element driving circuit 122 also mounted on the temple tip for display device 270 side, and so the display device for eyeglasses 100 simply includes elements such as the display element 101, a backlight and an eyepiece optical part 103 (see FIG. 1) mounted thereon. Thus the display device for eyeglasses 100 can be made more compact and be lighter in weight.

The head mounted displays disclosed herein are not limited to the aforementioned embodiments, and various modifications and alternations may be made thereto. For instance, although the above embodiments show a head mounted display for right ear, a head mounted display for left ear also can be configured in a similar manner. The attachment part of the display device for eyeglasses on the temple tip for display device is not limited to a groove, which may be a protrusion. In this case, a groove in which the protrusion of the attachment part is engagement is formed on the display device for eyeglasses side. The shape of these mutually engaging groove and protrusion is not limited to a columnar shape, and it may be any shape such as a prismatic shape.

The attachment part on the temple tip for display device side is not limited to the configuration where the display device for eyeglasses is engaged and supported to be slidable in the direction inclined downwardly to the front side, and the display device for eyeglasses may be slidable in the direction substantially parallel to the temple part or in the direction inclined downwardly to the rear side for engagement and supporting. The display device for eyeglasses may be detachably engaged and supported at the temple tip for display device in a fixed manner. In this case, the display device for eyeglasses and the temple tip for display device may be connected mechanically and electrically via a connector. In this case, the display device for eyeglasses may be provided with a mechanism to adjust the position of the eyepiece optical part depending on the size of the eyeglass frame and the size of the user's head as needed. The wireless communication circuit at the first electrical part or at the second electrical part may be omitted appropriately, and an input terminal for display information may be provided instead.

Reference Signs List

100 Display device for eyeglasses (first unit)
101 Display element
102 First electrical component (display-side electrical component)
103 Eyepiece optical part
104 Protrusion
111, 112 Electrode
120 Signal processing circuit
121 Wireless communication circuit
122 Display element driving circuit
200, 220, 230, 240, 250, 260, 270 Temple tip for display device (second unit)
201 Temple connecting part
202 Second electrical component (eyeglass-side electrical component)
203 Groove (attachment part)
204 Rear part
205 Upper part
206 Forward part
207 Earphone part
210 Battery
211, 212 Electrode
221 Sensor
241 Speaker
251 Bone-conduction speaker (Vibration element)
261 Memory
300 Eyeglass frame
301 Temple

What is claimed is:

1. A head mounted display for use with an eyeglass frame, the head mounted display comprising:
   a first unit and a second unit,
   wherein
   the first unit comprises a first electrical component including a display element and an eyepiece optical part arranged in front of an eye of a user to conduct a display image of the display element to the eye of the user to allow the user to observe the display image by the display element as a virtual image,
   the second unit is a temple tip configured to surround an ear-side portion of a temple of the eyeglass frame, the second unit further having a temple connecting part to which the ear-side portion of the temple of the eyeglass frame is attachable to secure the eyeglass frame to the second unit, the second unit including a second electrical component and an attachment part to detachably engage the second unit to the first unit,
   when the first unit is engaged to the second unit through the attachment part, the first electrical component and the second electrical component are electrically coupled; and
   the temple connecting part is spatially separated from the attachment part.

2. The head mounted display according to claim 1, wherein when the first unit is engaged and supported in the attachment part, a load of the first unit is applied to an ear of the user via the second unit.

3. The head mounted display according to claim 1, wherein the attachment part and the first unit each comprise at least a pair of electrodes to electrically couple the first electrical component and the second electrical component when the first unit is engaged and supported in the attachment part.

4. The head mounted display according to claim 1, wherein
in the attachment part, the first unit is engaged and supported to be slidable along the second unit, and
the attachment part and the first unit each comprises at least a pair of electrodes to electrically couple the first electrical component and the second electrical component when the first unit is engaged and supported in the attachment part.

5. The head mounted display according to claim 4, wherein the pair of electrodes as the pair at each of the attachment part and the first unit are disposed to be away from each other in a direction orthogonal to a sliding direction of the head mounted display.

6. The head mounted display according to claim 1, wherein the attachment part is disposed above the ear of the user.

7. The head mounted display according to claim 6, wherein the attachment part has a shape that is inclined downwardly toward a front side of the ear of the user.

8. The head mounted display according to claim 1, wherein the second electrical component contains at least one of a power supply, a user information acquisition part, a sound output part and a controller.

9. The head mounted display according to claim 8, wherein
the second electrical component contains a battery, and
when the first unit is engaged and supported in the attachment part, electricity is supplied from the battery to the first electrical component.

10. The head mounted display according to claim 9, wherein the second unit has a center of mass thereof that is located behind the ear of the user.

11. The head mounted display according to claim 9, wherein the battery is disposed behind the ear of the user.

12. The head mounted display according to claim 8, wherein the second electrical component comprises a sensor built therein, and
when the first unit is engaged and supported in the attachment part, output information from the sensor is transmitted to the first electrical component.

13. The head mounted display according to claim 8, wherein the second electrical component comprises a speaker built therein, and
when the first unit is engaged and supported in the attachment part, a sound signal is transmitted from the first electrical component to the second electrical component.

14. The head mounted display according to claim 8, wherein
the second electrical component comprises a sensor, a signal processing circuit, a memory and the power supply comprises a battery built therein, and
when the first unit is not engaged and supported in the attachment part, output information from the sensor is stored in the memory via the signal processing circuit.

15. The head mounted display according to claim 8, wherein
the second electrical component further include a driving circuit of the display element built therein, and
when the first unit is engaged and supported in the attachment part, the display element is driven by the driving circuit.

16. A display device for eyeglasses for use with a temple tip for display device, the temple tip for display device comprising a first electrical component and a first attachment part configured to detachably engage with the display device for eyeglasses, the display device for eyeglasses comprising:
a second electrical component including a display element;
an eyepiece optical part arranged in front of an eye of a user to conduct a display image of the display element to the eye of the user to allow the user to observe a display image by the display element as a virtual image; and
a second attachment part configured to detachably engage with the first attachment part of the temple tip for display device and that electrically couples the second electrical component to the first electrical component in the temple tip for display device when the display device for eyeglasses is engaged and supported in the temple tip for display device; wherein
the second attachment part comprises at least a pair of electrodes to electrically couple the first electrical component and the second electrical component;
the pair of electrodes are disposed to be away from each other in a direction orthogonal to a sliding direction of the second attachment part; and
wherein the second electrical component having a weight and a position relative to an ear of the user to at least partially offset a weight and a position relative to the ear of the user of the optical eyepiece part.

17. A temple tip for display device for use with a display device for eyeglasses, the display device for eyeglasses comprising a first electrical component comprising a display element, and an eyepiece optical part that allows a user to observe a display image by the display element as a virtual image, the temple tip for display device comprising:
a second electrical component;
an attachment part configured to detachably engage with the display device for eyeglasses; and
a temple tip connection part configured to be attachable to an ear-side portion of a temple of an eyeglass frame is attachable to secure the eyeglass frame to the temple tip for display device; wherein
the attachment part includes a display connecting part that electrically couples the second electrical component to the first electrical component when the display device for eyeglasses is engaged and supported in the temple tip for display device;
the temple tip connection part is spatially separated from the attachment part; and
the temple tip for display device being configured to surround the ear-side portion of the temple of the eyeglass frame when the temple tip connection part is attached to the ear-side portion of the temple of the eyeglass frame.

18. The head mounted display according to claim 1, wherein the temple tip connection part is spatially separated from the attachment part in a direction transverse to a longitudinal direction of the temple of the eyeglass frame.

19. The temple tip for display device according to claim 17, wherein the temple tip connection part is spatially separated from the attachment part in a direction transverse to a longitudinal direction of the temple of the eyeglass frame.

20. The head mounted display according to claim 1, wherein the temple tip connection part is disposed along a first axis and the attachment part is disposed along a second axis, wherein an extension of the first axis intersects with an extension of the second axis at a position between the second unit and a lens of the eyeglass frame when the ear-side portion is secured to the second unit.

21. The temple tip for display device according to claim 17, wherein the temple tip connection part is disposed along a first axis and the attachment part is disposed along a second axis, wherein an extension of the first axis intersects with an extension of the second axis at a position between the temple tip for display device and a lens of the eyeglass frame when the ear-side portion is secured to the temple tip for display device.

22. A head mounted display for use with an eyeglass frame, the head mounted display comprising:
   a first unit and a second unit,
   wherein
   the first unit comprises a first electrical component including a display element and an eyepiece optical part arranged in front of an eye of a user to conduct a display image of the display element to the eye of the user to allow the user to observe the display image by the display element as a virtual image,
   the second unit having a temple connecting part to which an ear-side portion of a temple of the eyeglass frame is attachable to secure the eyeglass frame to the second unit, the second unit including a second electrical component and an attachment part to detachably engage the second unit to the first unit, wherein
   when the first unit is engaged to the second unit through the attachment part, the first electrical component and the second electrical component are electrically coupled;
   the temple connecting part is spatially separated from the attachment part; and
   the attachment part is configured to be disposed above the ear of the user wherein the temple connecting part is a groove formed in the second unit, the groove having a shape for accepting the most ear-side portion of the temple of the eyeglass frame therein.

23. A head mounted display for use with an eyeglass frame, the head mounted display comprising:
   a first unit and a second unit,
   wherein
   the first unit comprises a first electrical component including a display element, and an eyepiece optical part arranged in front of an eye of a user to conduct a display image of the display element to the eye of the user to allow the user to observe the display image by the display element as a virtual image,
   the second unit is a temple tip having a portion configured to be supported by a rear-side of an ear of the user, the second unit further having a temple connecting part to which an ear-side portion of a temple of the eyeglass frame is attachable to secure the eyeglass frame to the second unit, the second unit including a second electrical component and an attachment part to detachably engage the second unit to the first unit,
   when the first unit is engaged to the second unit through the attachment part, the first electrical component and the second electrical component are electrically coupled; and
   the temple connecting part is spatially separated from the attachment part wherein the first electrical component having a weight and a position relative to an ear of the user to at least partially offset a weight and a position relative to the ear of the user of the optical eyepiece part.

24. The head mounted display according to claim 1, wherein the temple connecting part is a groove formed in the second unit, the groove having a shape for accepting the temple of the eyeglass frame therein.

25. The temple tip for display device according to claim 17, wherein the temple tip connection part is a groove formed in the second unit, the groove having a shape for accepting the temple of the eyeglass frame therein.

26. The head mounted display according to claim 1, wherein the second electrical component having a weight and a position relative to an ear of the user to at least partially offset a weight and a position relative to the ear of the user of the optical eyepiece part.

27. The head mounted display according to claim 1, wherein the first unit is slidably engaged to the second unit through the attachment part.

28. The display device for eyeglasses according to claim 16, wherein the second attachment part being configured to be slidable along the first attachment part.

29. The temple tip for display device according to claim 17, wherein the temple tip for display device is configured to be slidably engaged to the display device for eyeglasses through the attachment part.

30. The head mounted display according to claim 1, wherein the attachment part comprises a first attachment part disposed on the first unit and a second attachment part disposed on the second unit, one of the first and second attachment parts being a groove with an opening formed along the longitudinal axis.

* * * * *